(12) United States Patent
Harmon (10) Patent No.: US 12,538,864 B2
(45) Date of Patent: Feb. 3, 2026

(54) ROW UNIT CLEAN OUT SYSTEM AND METHOD

(71) Applicant: DEERE & COMPANY, Moline, IL (US)

(72) Inventor: Andrew W. Harmon, Geneseo, IL (US)

(73) Assignee: Deere & Company, Moline, IL (US)

( * ) Notice: Subject to any disclaimer, the term of this patent is extended or adjusted under 35 U.S.C. 154(b) by 755 days.

(21) Appl. No.: 17/892,658

(22) Filed: Aug. 22, 2022

(65) Prior Publication Data

US 2024/0057519 A1    Feb. 22, 2024

(51) Int. Cl.
*A01C 15/00* (2006.01)
*A01C 7/10* (2006.01)
*A01C 7/20* (2006.01)

(52) U.S. Cl.
CPC ............ *A01C 15/006* (2013.01); *A01C 7/105* (2013.01); *A01C 7/20* (2013.01)

(58) Field of Classification Search
CPC ..... A01C 15/005; A01C 15/006; A01C 15/04; A01C 7/105; A01C 7/20
See application file for complete search history.

(56) References Cited

U.S. PATENT DOCUMENTS

| | | | |
|---|---|---|---|
| 6,070,539 A * | 6/2000 | Flamme et al. .... | A01M 7/0089 701/50 |
| 6,899,042 B1 | 5/2005 | Kowalchuk | |
| 9,775,279 B2 | 10/2017 | Garner et al. | |
| 2016/0037713 A1* | 2/2016 | Wendte et al. ...... | A01C 21/005 111/177 |
| 2016/0095274 A1* | 4/2016 | Wendte et al. ...... | A01B 79/005 111/200 |
| 2017/0086356 A1* | 3/2017 | Schweitzer et al. ... | A01C 5/068 |
| 2019/0053419 A1* | 2/2019 | Schoeny et al. ........ | F16K 1/126 |

FOREIGN PATENT DOCUMENTS

| | | |
|---|---|---|
| DE | 19745098 A1 | 4/1999 |
| DE | 102016207510 A1 | 11/2017 |

OTHER PUBLICATIONS

Extended European Search Report and Written Opinion issued in European Patent Application No. 23180616.7, dated Jan. 23, 2024, in 05 pages.

* cited by examiner

*Primary Examiner* — Tara Mayo
(74) *Attorney, Agent, or Firm* — Taft Stettinius & Hollister LLP; Stephen F. Rost (57) ABSTRACT

An agricultural machine comprises a central commodity storage tank configured to store commodity, a row unit having a hopper configured to receive the commodity from the tank and a meter configured to distribute the commodity from the hopper to the soil. A manifold assembly is positioned between the central storage tank and the hopper and includes a controllable valve configured to direct commodity. The controller moves the valve between positions to direct commodity from the central storage tank to the hopper and either from the hopper to the central storage tank or from the hopper to a seed bin separate from the central storage tank. The controller may move the valve in response to measured characteristics associated with the distribution of commodity or in response to input from a user interface.

20 Claims, 5 Drawing Sheets

ROW UNIT CLEAN OUT SYSTEM AND METHOD

FIELD OF THE DISCLOSURE

The present disclosure relates to an agricultural machine for planting, and in particular, to a system and method for reversing flow of commodity through the agricultural machine.

BACKGROUND OF THE DISCLOSURE

Conventional agricultural work machines such as planters or seeding machines are used for dispensing commodity in a field. The type of commodity can be fertilizer, seed, chemical granulates, and the like. After the commodity is distributed, a user often cleans the tank, hoses, secondary hoppers, meters, etc. from any remaining commodity. At times, the remaining commodity can be significant. If the commodity remains in the hopper, etc., it can damage the machine and/or the commodity over time. This becomes more problematic when the machine includes multiple row units, for example. The cleaning process is generally a manual process, and it can be lengthy. A machine may include meter purge functionality, but this is primarily a manual process that is time-consuming. Moreover, the user may be unable to access the row unit hoppers due to space constraints associated with machines having multiple row units. Thus, there is a need for a better process of removing leftover commodity.

SUMMARY

In an illustrative embodiment, an agricultural machine for distributing commodity, comprises: a frame; a tank coupled to the frame and configured to store the commodity; a row unit coupled to the frame, the row unit comprising a hopper and a seed meter; a manifold assembly configured to direct commodity through the agricultural machine; a tank line coupled between the tank and the manifold assembly; a row unit line coupled between the manifold assembly and the hopper; a return line coupled between the manifold assembly and the tank; a blower configured to provide an air flow through the tank line and the row unit line to transfer commodity from the tank, through the manifold assembly, and to the hopper of the row unit; and a vacuum assembly configured to provide an air flow through the row unit line and the return line to transfer commodity from the hopper of the row unit, through the manifold assembly, and to the tank.

In some embodiments, the manifold assembly includes a valve having a blocker movable between a first position and second position; wherein, when the blocker is in the first position, the commodity flows from the tank line, through the valve, to the row unit line; and wherein, when the blocker is in the second position, the commodity flows from the row unit line, through the valve, to the return line.

In some embodiments, the agricultural machine further comprises a controller operatively coupled to the vacuum assembly and configured to switch the vacuum assembly on and off; and wherein, when switched on by the controller, the vacuum assembly provides suction to the hopper of the row unit and air flow through the row unit line toward the manifold assembly. In some embodiments, the controller is operatively coupled to the valve and configured cause movement of the blocker between the first position and the second position. In some embodiments, the controller switches the vacuum assembly on simultaneously with movement of the blocker to the second position; and the controller switches the vacuum assembly off simultaneously with movement of the blocker to the first position.

In some embodiments, the agricultural machine further comprises a metering sensor configured to measure a characteristic associated with the commodity metered from the seed meter; and the metering sensor is operatively coupled to the controller and configured to send a signal to the controller indicative of the measured characteristic associated with the commodity metered from the seed meter; and the controller is configured to switch on the vacuum assembly to provide suction to the hopper of the row unit and air flow through the row unit line in response to detecting an irregularity in the measured characteristic associated with the commodity metered from the seed meter.

In some embodiments, the agricultural machine further comprises a metering sensor configured to measure the singulation rate of seed metered by the seed meter; wherein the metering sensor is operatively coupled to the controller and configured to send a signal to the controller indicative of the singulation rate of seed metered by the seed meter; and wherein the controller is configured to switch on the vacuum assembly to provide air flow through the row unit line in response to determining that a measured singulation rate is below a desired singulation rate.

In some embodiments, the agricultural machine further comprises a reed valve formed in the hopper of the row unit; wherein when the blocker is in the first position, the reed valve is urged to an open position by the air flow from the blower to facilitate discharge of air flow from the hopper; and wherein when the blocker is in the second position, the reed valve is urged to a closed position by the air flow from the vacuum assembly to facilitate suction of commodity from the hopper.

In some embodiments, the agricultural machine includes a plurality of row units and a plurality of row unit lines, wherein each row unit line is coupled between the manifold assembly and a hopper of a corresponding row unit; wherein the vacuum assembly includes a plurality of vacuum devices each configured to provide air flow through one row unit line and suction to a corresponding hopper; and wherein the agricultural machine further comprises a compressed air source configured to provide compressed air to each vacuum device.

In some embodiments, the agricultural machine further comprises a plurality of row units coupled to the frame, each comprising a hopper and a seed meter; a plurality of tank lines coupled between the tank and the manifold assembly; a plurality of row unit lines coupled between the manifold assembly and corresponding hoppers; wherein the manifold assembly includes a first manifold, a second manifold, and a valve positioned between and coupled to the first manifold and the second manifold; wherein the first manifold is coupled at a first end thereof to the plurality of tank lines and at a second end thereof to a first opening of the valve; wherein the second manifold is coupled at a first end thereof to the plurality of row unit lines and at a second end thereof to a second opening of the valve; and wherein the return line is couple to a third opening of the valve.

In some embodiments, the manifold assembly is a first manifold assembly and the agricultural machine further comprises a second manifold assembly; wherein the agricultural machine further comprises: a first return line coupled between the first manifold assembly and the tank, and a second return line coupled between the second manifold assembly and the tank; a plurality of row units coupled to the frame, each comprising a hopper and a seed meter; a first plurality of tank lines coupled between the tank and the first manifold assembly, a second plurality of tank lines coupled between the tank and the second manifold assembly; a first plurality of row unit lines coupled between the manifold assembly and corresponding hoppers, and a second plurality of row unit lines coupled between the manifold assembly and corresponding hoppers; wherein the agricultural machine further comprises a compressed air source that provides air flow to the first manifold assembly and the second manifold assembly; and wherein the first manifold assembly and the second manifold assembly cannot receive airflow from the compressed air source simultaneously.

In another illustrative embodiment, an agricultural machine for distributing commodity comprises a frame; a tank coupled to the frame and configured to store the commodity; a row unit coupled to the frame, the row unit comprising a hopper and a seed meter; a manifold assembly configured to direct commodity through the agricultural machine; a tank line coupled between the tank and a first opening of the manifold assembly; a row unit line coupled between a second opening of the manifold assembly and the hopper; a return line coupled to a third opening of the manifold assembly; a blower configured to provide an air flow through the tank line and the row unit line to transfer commodity from the tank, through the manifold assembly, and to the hopper of the row unit; and a vacuum assembly configured to provide an air flow through the row unit line and the return line to transfer commodity through the row unit line, through the manifold assembly, and through the return line; wherein the third opening is positioned between the first opening and the second opening.

In some embodiments, the return line is coupled between the third opening of the manifold assembly and a seed bin that is separate from the tank; and the vacuum assembly is configured to provide the air flow through the return line to transfer commodity through the return line to the seed bin.

In some embodiments, the agricultural machine further comprises a controller operatively coupled to the vacuum assembly and configured to switch the vacuum assembly on and off; and the vacuum assembly provides suction to the hopper of the row unit and air flow through the row unit line when switched on by the controller. In some embodiments, the manifold assembly includes a valve having a blocker movable between a first position and second position; wherein, when the blocker is in the first position, the commodity flows from the tank line, through the valve, to the row unit line; and wherein, when the blocker is in the second position, the commodity flows from the row unit line, through the valve, to the return line.

In some embodiments, the agricultural machine further comprises a reed valve formed in the hopper of the row unit; wherein when the blocker is in the first position, the reed valve is in an open position facilitating discharge of air flow from the hopper; and wherein when the blocker is in the second position, the reed valve is in a closed position facilitating suction of commodity from the hopper.

In some embodiments, the agricultural machine further comprises a user interface and a controller operatively coupled to the user interface and to the blocker; wherein the controller is configured to move the blocker between the first position and the second position in response to input received from the user interface.

In some embodiments, the agricultural machine further comprises a compressed air source that provides compressed air to the vacuum assembly when the blocker is in the second position.

In another illustrative embodiment, a method of advancing commodity through an agricultural machine comprises: advancing commodity from a tank, through a tank line, which is coupled between the tank and the manifold assembly; subsequent to the prior advancing step, advancing the commodity through a first opening of a valve of the manifold assembly and subsequently through a second opening of the valve; subsequent to the prior advancing step, advancing the commodity through a row unit line, away from the manifold assembly, wherein the row unit line is coupled between the manifold assembly and a hopper of a row unit; subsequent to the prior advancing step, advancing the commodity from the hopper, through the row unit line toward the manifold; subsequent to the prior advancing step, advancing the commodity through the second opening of the valve and subsequently through a third opening of the valve; and subsequent to the prior advancing step, advancing the commodity through a return line away from the manifold assembly.

In some embodiments, the method further comprises repositioning the valve from a first position, in which the third opening is blocked, to a second position, in which the first opening is blocked.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
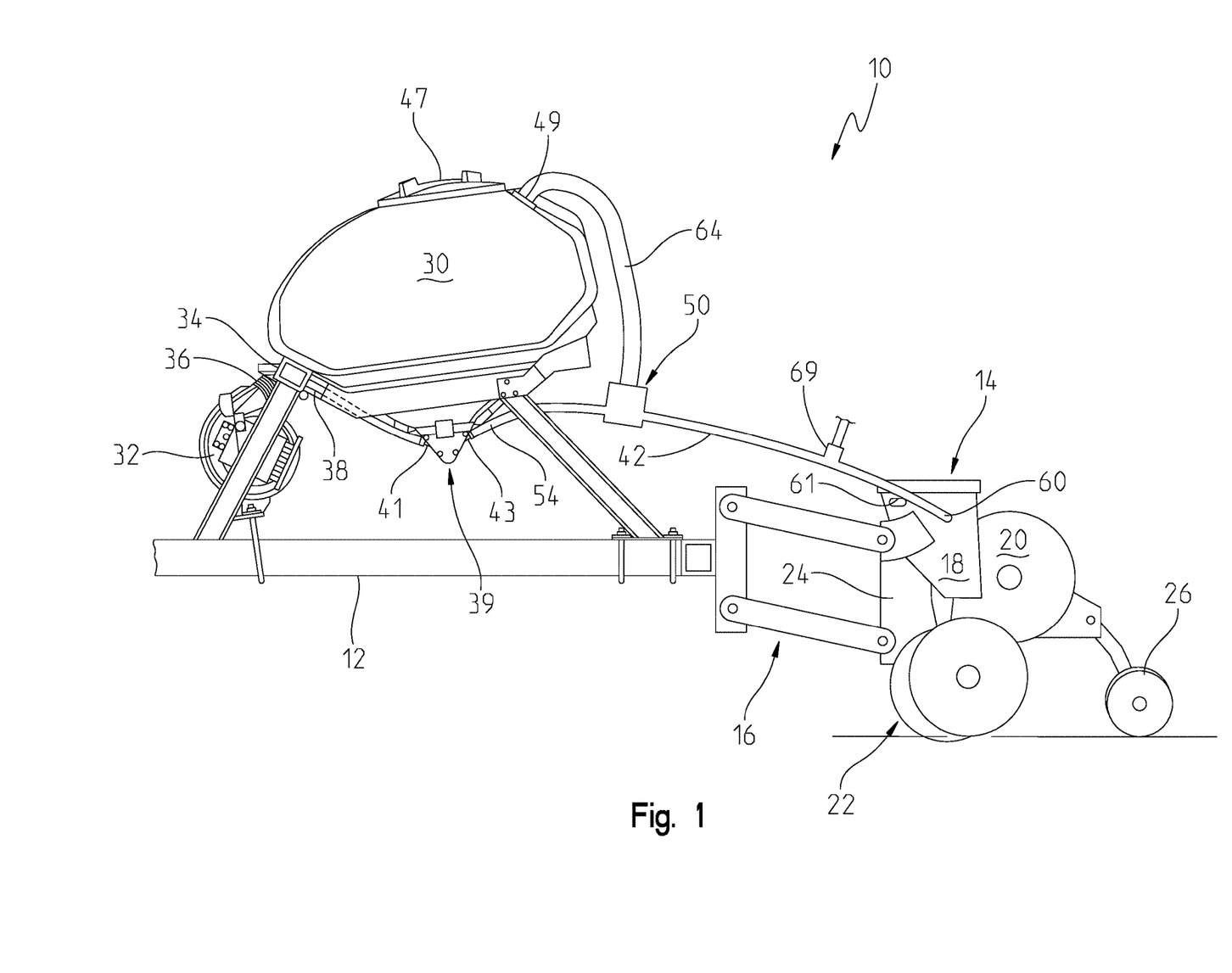
FIG. 1 is a side view of an agricultural machine having a central commodity tank, a row unit, a manifold assembly, and a plurality of hoses or lines connecting the manifold assembly to the central commodity tank and the row unit.

Referring to FIG. 1 of the present disclosure, an embodiment of an agricultural work machine 10 such as a planter or seeder may include a frame 12 to which one or more row units 14 may be mounted. In FIG. 1, only a single row unit 14 is shown, but it is to be understood that a plurality of row units 14 may be coupled to the frame 12 in a known manner. The row unit 14 may be coupled to the frame 12 by a linkage assembly 16 (e.g. a parallelogram assembly) so that the row unit 14 can move up and down to a limited degree relative to the frame 12.

Each row unit 14 may include an auxiliary or secondary hopper 18 for holding commodity such as fertilizer, seed, chemical, or any other known commodity. In this embodiment, the secondary hopper 18 may hold seed. As such, a seed meter 20 is shown for metering seed received from the secondary seed hopper 18. A furrow opener 22 may be provided on the row unit 14 for forming a furrow in a field for receiving metered seed (or other commodity) from the seed meter 20. The seed or other commodity may be transferred to the furrow from the seed meter 20 by a seed tube 24. A closing assembly 26 may be coupled to each row unit 14 and is used to close the furrow with the seed or other commodity contained therein.

In this embodiment, the seed meter 20 is a vacuum seed meter, although in alternative embodiments other types of seed meters using mechanical assemblies or positive air pressure may also be used for metering seed or other commodity. As described above, the present disclosure is not solely limited to dispensing seed. Rather, the principles and teachings of the present disclosure may also be used to apply non-seed commodities to the field. For seed and non-seed commodities, the row unit 14 may be considered an application unit with a secondary hopper 18 for holding commodity, a commodity meter for metering commodity received from the secondary hopper 18 and an applicator for applying the metered commodity to a field. For example, a dry chemical fertilizer or pesticide may be directed to the secondary hopper 18 and metered by the commodity meter and applied to the field by the applicator.

Referring to FIG. 1, the frame 12 of the machine 10 may further support a main hopper or central commodity tank 30 and a blower or fan 32. The blower or fan 32 may be operably driven by a hydraulic motor. In another embodiment, however, other motor arrangements such as an electric motor and the like may be used. The blower or fan 32 can direct pressurized air to a manifold 34 through a main air hose or line 36. The manifold 34 may be formed from a hollow closed tubular structure supported by the main frame 12 and may be provided with a plurality of manifold outlets corresponding to the number of row units 14 mounted to the frame 12. In this embodiment, individual air supply lines 38 may extend from the manifold outlets and direct pressurized air from the manifold 34 to an upstream side of a nozzle assembly 39. The nozzle assembly 39 may be located at a lower or bottom portion of the main hopper or tank 30 as shown best in FIG. 2 of the present disclosure.

As commodity such as fertilizer or seed is deposited into the tank 30, the commodity flows by gravity to the nozzle assembly 39. Commodity in the form of seed or non-seed commodity may be placed in the tank 30 through a lid 47. In some embodiments, the nozzle assembly 39 may be provided with a concave bottom having outwardly diverging sidewalls that funnel commodity to the nozzle 39. The upstream side of the nozzle assembly 39 is provided with a number of air inlets 41 corresponding to the number of air supply hoses 38. The air inlets 41 may be spaced transversely along the upstream side of the nozzle assembly 39.

Figure 2:
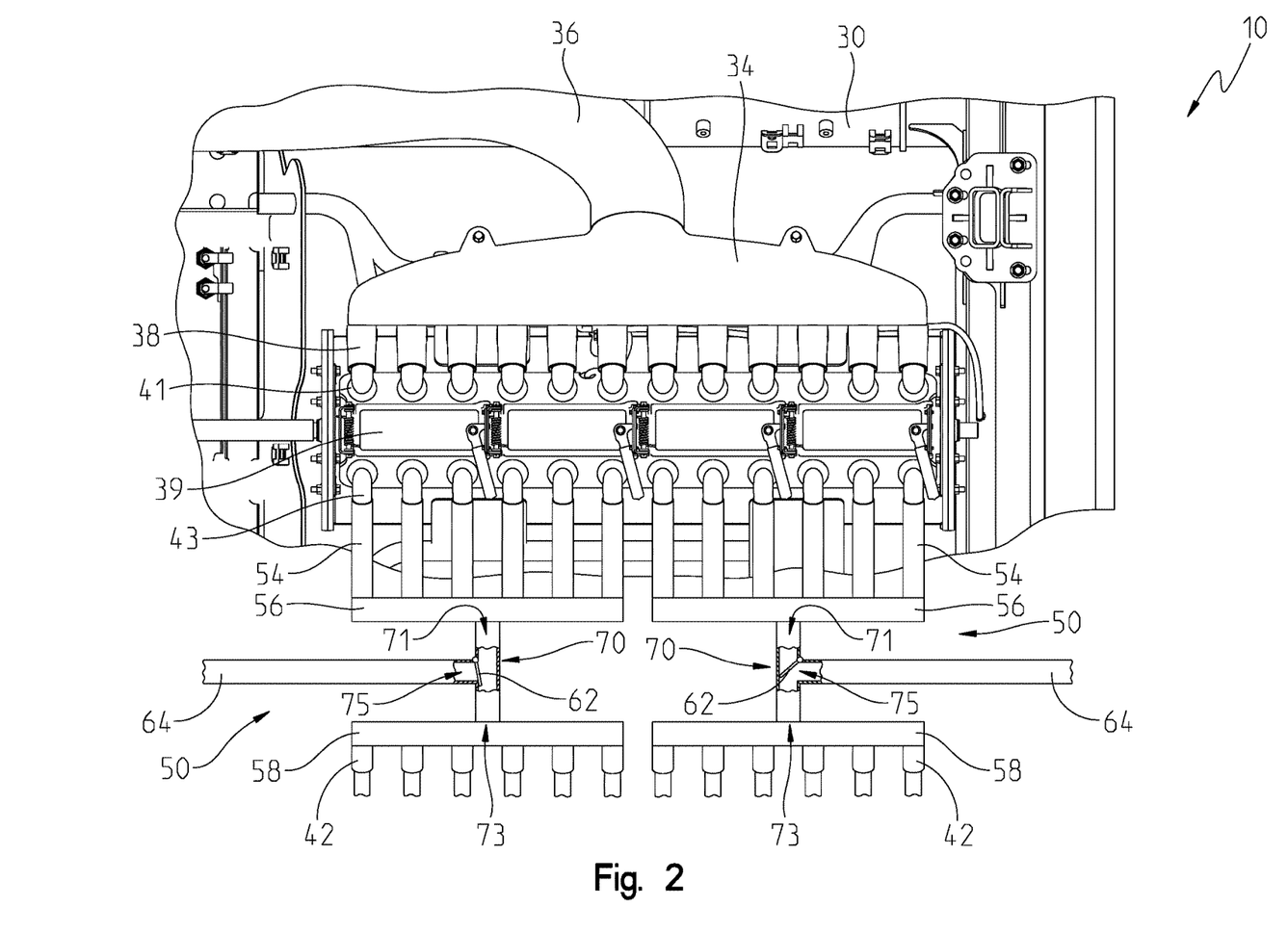
FIG. 2 is a bottom up view of the central commodity tank, which is shown coupled to the manifold assembly, which is coupled to return lines that are configured to facilitate passage of commodity back to the central commodity tank or to a separate seed bin when the commodity is forced upstream by operation of a vacuum assembly.

The downstream side of the nozzle assembly 39 may be provided with a number of commodity outlets 43 corresponding to the number of air supply hoses 38. The commodity outlets 43 may also be spaced transversely along the downstream side of the nozzle assembly 39. The commodity outlets 43 lie opposite from the air inlets 41, as shown in FIG. 2. Each air inlet 41 is aligned with a respective commodity outlet 43. The commodity outlets 43 may be coupled to a manifold assembly 50, which will be described below in greater detail. As shown in FIG. 1, the agricultural machine 10 includes row unit lines 42 are coupled to and extend from the manifold assembly 50 to the individual secondary hoppers 18 for directing commodity entrained in the air stream to the secondary hoppers 18.

The transfer of commodity from the tank 30 to the secondary hoppers 18 can be done automatically as commodity is needed by the secondary hopper 18. As an individual secondary hopper 18 fills up with commodity, an inlet 60 of the secondary hopper 18 becomes covered by commodity blocking and slowing the air stream so that the air stream no longer picks up commodity in the tank 30 and transports the commodity to the secondary hopper 18. Conversely, as commodity is metered by the commodity meter 20 and dispensed to the ground, the quantity of commodity in the hopper 18 begins to drop such that the inlet 60 can be uncovered. As this happens, the air stream from the blower 32 picks up commodity for delivery to the secondary hopper 18. In this way, the secondary hoppers 18 may be continuously and automatically provided with commodity on-demand so long as the blower 32 is running, commodity is available in the nozzle assembly 39, and a vacuum assembly 52 has not been activated (as will be described in greater detail below). The side walls of each secondary hopper 18 may be provided with reed valves 61 for venting air pressure out of the secondary hopper 18 during a work operation and preventing airflow into the secondary hopper 18 during operation of the vacuum assembly 52. In some embodiments, the reed valves 61 can also be located in the lids of the secondary hoppers 18 as long as the reed valves 61 are above the respective commodity inlets 60. The reed valves 61 are a type of check valve, which restrict the flow of are to a single direction (i.e. out of the hopper 18). Each reed valve 61 opens in response to positive pressure on the inner face of the valve and closes in response to suction on the inner face of the valve.

In some embodiments, as shown in FIG. 2, the manifold assembly 50 includes a first manifold 56, a second manifold 58, and a valve 70 coupled to and positioned between the first and second manifolds 56, 58. In the illustrative embodiment, the agricultural machine 10 also includes a plurality of tank lines 54 that are each coupled to a respective commodity outlet 43. On the upstream side of the manifold assembly 50, the tank lines 54 are each coupled to the first manifold 56. On the downstream side of the manifold assembly 50, the row unit lines 42 are each coupled to the second manifold 58.

It should be appreciated that the agricultural machine 10 may include more than one manifold assembly 50. For example, as shown in FIG. 2, a first group of six commodity outlets 43 may be coupled to a first manifold assembly 50 (left) and a second group of six commodity outlets 43 may be coupled to a second manifold assembly 50 (right). It should be appreciated that agricultural machine 10 may have any number of manifold assemblies 50, with an appropriate number of commodity outlets 43 and corresponding number of row unit lines 42 coupled to the various manifold assemblies 50. To illustrate, where there are twelve commodity outlets 43 and twelve corresponding row unit lines 42, the agricultural machine 10 may include three manifold assemblies 50, each having four commodity outlets 43 and four corresponding row unit lines 42 coupled thereto. The suitable number of commodity outlets 43 and row unit lines 42 per manifold assembly 50 may be a function of the strength of the upstream (i.e. reverse) air flow created by operation of the vacuum assembly 52, as described in greater detail below.

In the illustrative embodiment, the first and second manifolds 56, 58 are each coupled to the valve 70 of the manifold assembly 50, which is sometimes referred to as a T-valve based on its corresponding structure and function. In the illustrative embodiment, the valve 70 includes a movable blocker 62 configured to direct the flow of commodity through the valve 70. In the illustrative embodiment, the valve 70 includes a first opening 71 coupled to the first manifold 56, a second opening 73 coupled to the second manifold 58, and a third opening 75 coupled to a return line 64 that is configured to facilitate flow of commodity away from the manifold assembly 50, as described in more detail below.

As suggested by FIG. 2, the blocker 62 is movable between a first position shown by the left manifold assembly 50 and a second position shown by the right manifold assembly 50. In the first position, the blocker 62 closes (i.e. blocks) and prevents the air flow and entrained seed from passing through the third opening 75, such that it cannot enter the return line 64 during a work operation. In the second position, the blocker 62 closes (i.e. blocks) and prevents the air flow and entrained seed from passing through the first opening 71, such that it cannot enter the tank lines 54 during operation of the vacuum assembly 52. The first opening 71 is not blocked by the blocker 62 when the blocker 62 is in the first position, and the third opening 75 is not blocked by the blocker 62 when the blocker 62 is in the second position. The second opening 73 is not blocked by the blocker 62 in either of the first and second positions.

Figure 3:
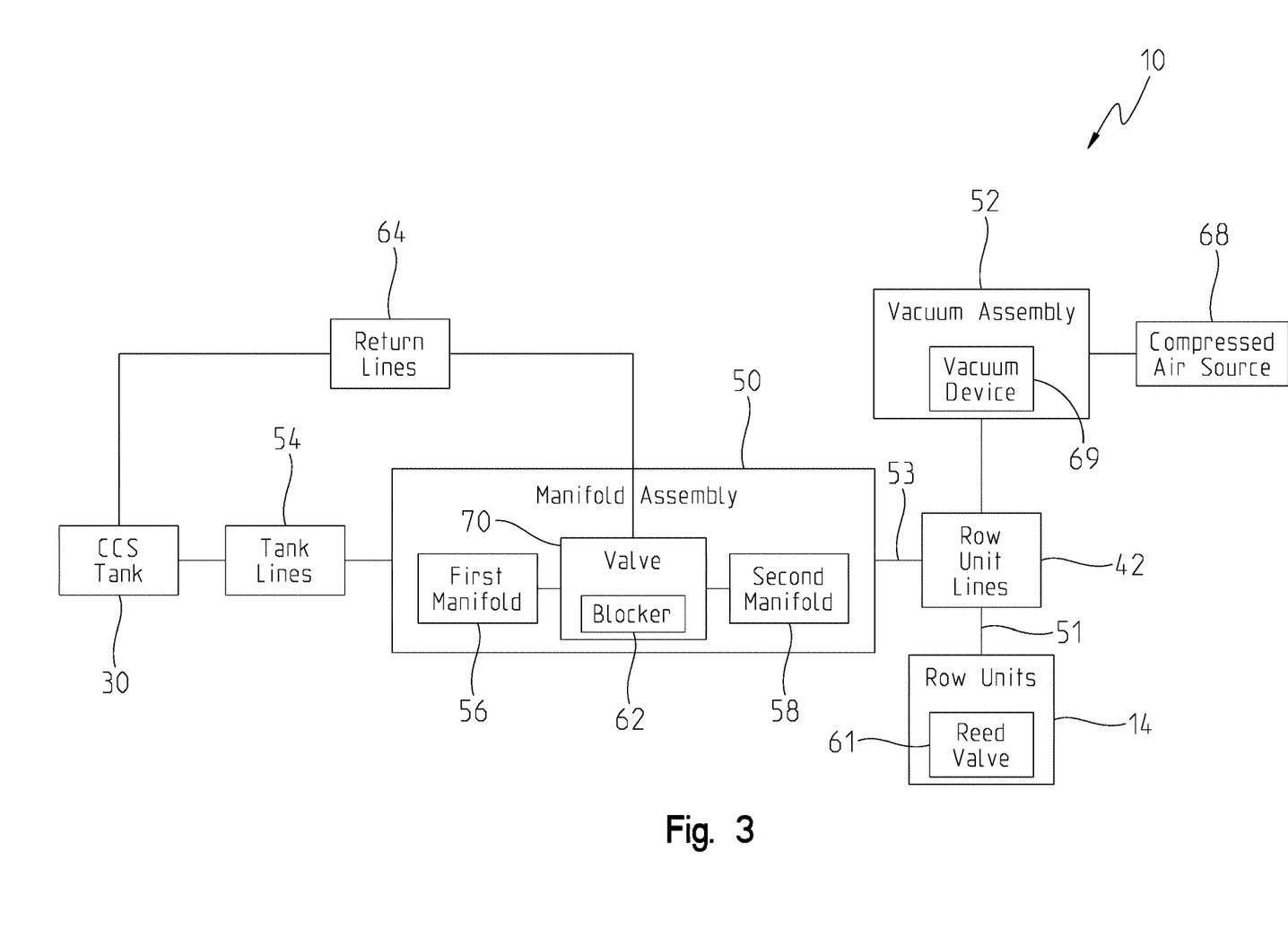
FIG. 3 is a diagrammatic view of an agricultural machine showing components used to distribute commodity to the soil during an agricultural operation and to facilitate reverse flow of commodity back to the central commodity tank during operation of the vacuum assembly.
Figure 4:
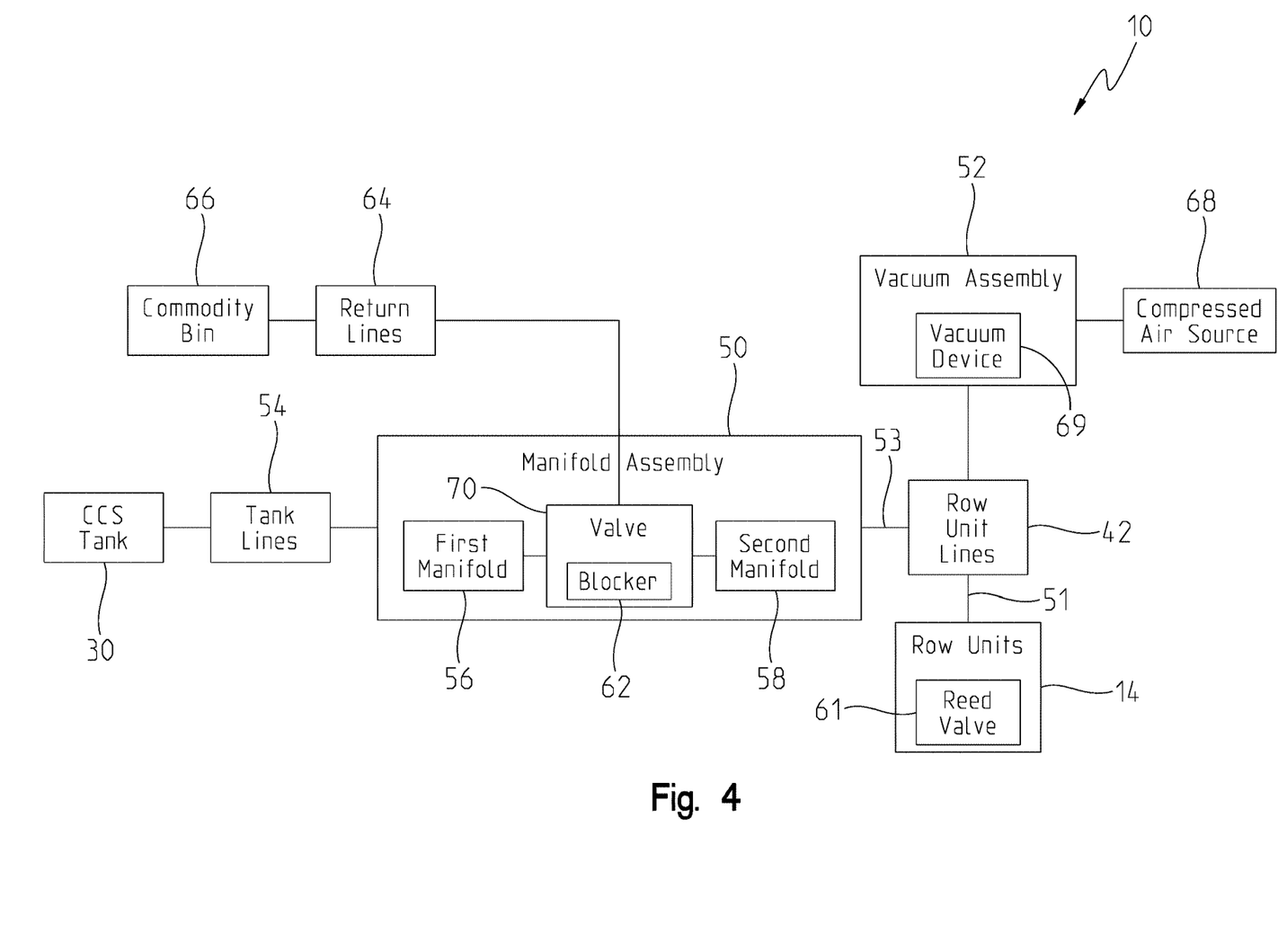
FIG. 4 is a diagrammatic view of an agricultural machine showing components used to distribute commodity to the soil during an agricultural operation and to facilitate flow of commodity to the seed bin during operation of the vacuum assembly.

Referring now to FIGS. 3 and 4, diagrammatic views of the agricultural machine 10 are shown. The tank lines 54 are coupled between the tank 30 and the manifold assembly 50 and facilitate flow from the tank 30 to the manifold assembly 50. Specifically, the tank lines 54 are coupled to the first manifold 56. The row unit lines 42 are coupled between and facilitate flow between the manifold assembly 50 and the row units 14. Specifically, the row unit lines 42 are coupled to the second manifold 58. The manifold assembly 50 includes the valve 70, which is coupled to the first manifold 56, the second manifold 58, and the return lines 64. In some embodiments, as shown in FIG. 3, the return lines are coupled between the manifold assembly 50 and facilitate flow from the manifold assembly 50 to the tank 30. For example, as shown in FIG. 1, the return line 64 opens to the tank 30 at the opening 49.

In some embodiments, as shown in FIG. 4, the return lines 64 are coupled between the manifold assembly 50 and one or more bins 66, which may be referred to as seed bins, and facilitate flow from the manifold assembly 50 to the one or more bins 66. Each bin 66 may have an opening accessible by a user to obtain commodity that is not used during a work operation at a location more easily accessible to the user than the hoppers 18 of the row units 14.

Referring still to FIGS. 3 and 4, in the illustrative embodiments, the vacuum assembly 52 is coupled between a compressed air source 68 and the row unit lines 42. The vacuum assembly 52 may have one or more vacuum devices 69. When a vacuum device 69 is coupled to a row unit line 42, a first portion (i.e., downstream portion) 51 of the row unit line 42 is coupled between the vacuum device 69 and the hopper 18 of the row unit 14 and a second portion (i.e., upstream portion) 53 of the row unit line 42 is coupled between the vacuum device 69 and the manifold assembly 50. In use, when the vacuum device 69 is switched on, compressed air flows into a chamber of the vacuum device 69, where it is then injected into the upstream portion 53 of the row unit line 42 towards the manifold assembly 50. This injection creates a vacuum or suction in the downstream portion 51 of the row unit line 42 and the hopper 18 of the row unit 14. This vacuum or suction pulls commodity positioned in the hopper 18 into the chamber of the vacuum device 69 and ultimately through the upstream portion 53 of the row unit line 42 towards the manifold assembly 50.

Referring again to FIGS. 3 and 4, in some embodiments the compressed air source 68 is supported by the frame 12 and in other embodiments, the compressed air source 68 is position away from the frame 12 (e.g., as a separate, tow-behind air tank, or on a tractor). In any event, in some embodiments, the compressed air source 68 supplies compressed air to multiple vacuum devices 69. For example, a separate vacuum device 69 may exist for each row unit line 42. In such embodiments, a controller 102 may be operatively coupled to one or more actuators of vacuum assembly 52 or to each vacuum device 69 of the vacuum assembly 52 to switch on and off the vacuum devices 52, as described in greater detail below. Any number of vacuum devices 69 may be switched on and off together or independently, and in some embodiments, the number of vacuum devices switched on together may be based on the availability of compressed air.

Figure 5:
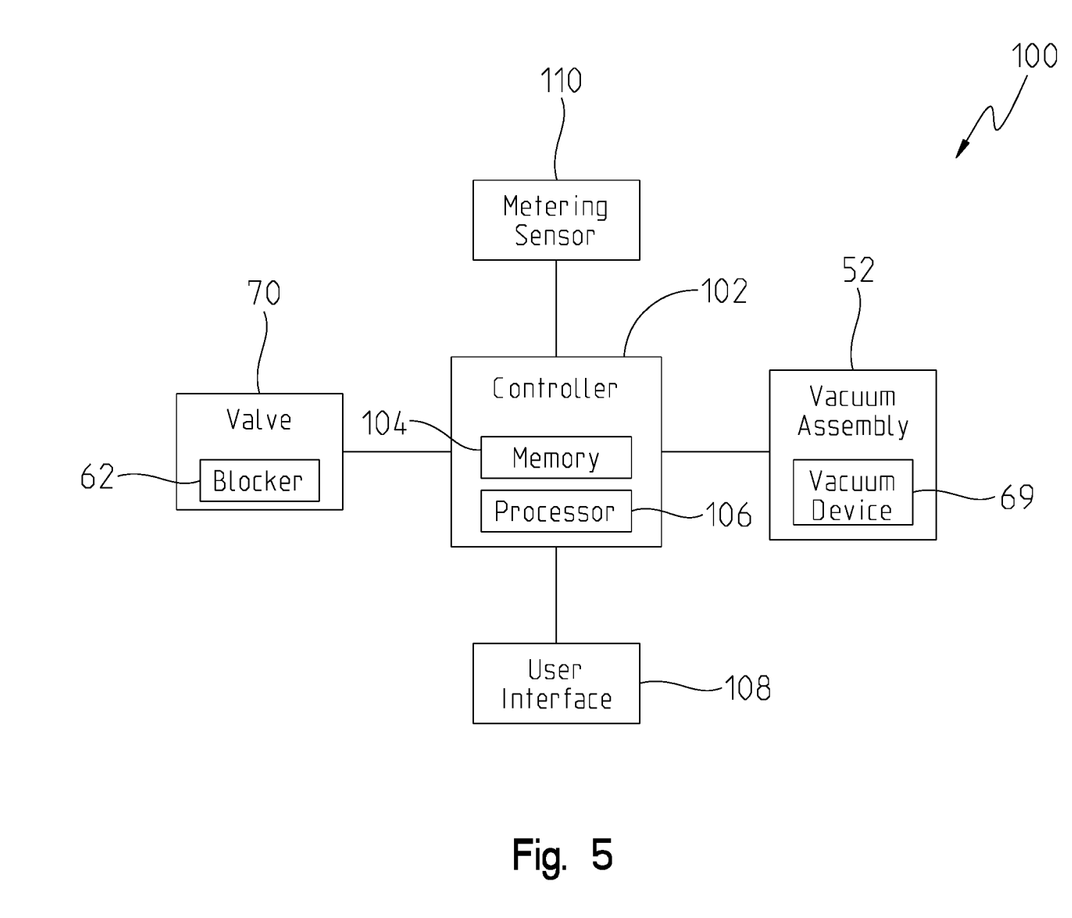
FIG. 5 is a diagrammatic view of a control system usable to control flow of commodity through an agricultural machine as described in the preceding figures.

Referring now to FIG. 5, the vacuum assembly 52 may be included in a control system 100. The control system 100 may also includes the valve 70, the controller 102, one or more memories 104 included on and/or accessible by the controller 102, one or more processors 106 included on and/or accessible by the controller 102, and a user interface 108. The one or more processors 106 are configured to execute instructions (i.e., algorithmic steps) stored on the one or more memories 104. The controller 102 may be a single controller or a plurality of controllers operatively coupled to one another. The controller 102 may be housed by the agricultural machine 10 or positioned remotely, away from the agricultural machine 10. The controller 102 may be hardwired or connected wirelessly to other components of the agricultural machine 10 via Wi-Fi, Bluetooth, or other known means of wireless communication. The user interface 108 is operatively coupled to the controller 102 and configured to send signals to the controller 102 indicative of information applied to the user interface 108 by a user.

Referring still to FIG. 5, in some embodiments, the controller 102 is operatively coupled to the valve 70 to cause movement of the blocker 62 between the first position and the second position. For example, the controller 102 may send signals to an actuator of the valve 70 coupled to the blocker 62, which moves the blocker 62 in response to signals received from the controller 102. In some embodiments, as suggest by FIG. 2, the agricultural machine 10 may include multiple valves 70. In this case, the controller 102 may be operatively coupled to each valve 70 to control movement of each valve 70 independently or together.

In some embodiments, as suggest above, the controller 102 is operatively coupled to the vacuum assembly 52 and configured to switch the vacuum assembly 52 on and off. When the vacuum assembly 52 is switched on, the vacuum device(s) 69 create positive air flow and suction using the compressed air supplied by the compressed air source 68 as described above. When the vacuum assembly 52 is switched off, the vacuum device(s) 69 do not create any air flow. In some embodiments, the controller 102 is configured to switch the vacuum assembly 52 on simultaneously with movement of the blocker 62 to the second position and configured to switch the vacuum assembly 52 off simultaneously with movement of the blocker 62 to the first position. In some embodiments, the controller 102 is coupled to the fan or blower 32 and configured to switch the fan or blower 32 on and off. In some embodiments, the controller 102 is configured to switch the fan or blower 32 on simultaneously with switching the vacuum assembly 52 off and vice-versa.

In some embodiments, as shown in FIG. 5, the control system 100 includes a metering sensor 110 configured to measure a characteristic associated with the commodity metered from the meter 20. For example, the metering sensor 110 may measure the singulation rate of seed metered by the meter 20 or vibration of the meter 20. The metering sensor 110 is operatively coupled to the controller 102 and configured to send a signal to the controller 102 indicative of the measured characteristic. In some embodiments, the controller 102 is configured to compare the measured characteristic (e.g. measured singulation rate) to a value stored in the memory 104 (e.g., desired singulation rate). If the controller 102 determines that the measured characteristic is beyond an accepted variance from the value stored in the memory 104, then the controller 102 switches on the vacuum assembly 52 to provide air flow through the row unit line 42 in response to the detection.

In practical terms, a clog may exist in a commodity line during a work operation. The metering sensor 110 may measure the characteristic associated with the meter 20, and the controller 102 may identify an irregularity (i.e., the clog) by comparing the measurement from the metering sensor 110 to the associated value stored in the memory 104. In response, the controller 102 may send signals to the components described above to achieve reverse air flow through the commodity lines to dislodge the clog. In the case of a singulation sensor, an extended delay in distribution of seed from the seed meter 20 is evidence of a clog.

In some embodiments, a user may provide input to the user interface 108 to clean out or unplug the hoppers 18, row unit lines 42, portions of the manifold assembly 50, or the return lines 64. Upon receipt of input from a user, the user interface 108 may send a signal to the controller 102, which in response, sends signals to the valve(s) 70 and the vacuum assembly 52 to reverse the flow of commodity as described above.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural machine for distributing commodity, comprising:
   a frame;
   a tank coupled to the frame and configured to store the commodity;
   a row unit coupled to the frame, the row unit comprising a hopper and a seed meter;
   a manifold assembly configured to direct commodity through the agricultural machine;
   a tank line coupled between the tank and the manifold assembly;
   a row unit line coupled between the manifold assembly and the hopper;
   a return line coupled between the manifold assembly and the tank;
   a blower configured to provide an air flow through the tank line and the row unit line to transfer commodity from the tank, through the manifold assembly, and to the hopper of the row unit; and
   a vacuum assembly configured to provide an air flow through the row unit line and the return line to transfer commodity from the hopper of the row unit, through the manifold assembly, and to the tank.

2. The agricultural machine of claim 1, wherein the manifold assembly includes a valve having a blocker movable between a first position and second position;
   wherein, when the blocker is in the first position, the commodity flows from the tank line, through the valve, to the row unit line; and
   wherein, when the blocker is in the second position, the commodity flows from the row unit line, through the valve, to the return line.

3. The agricultural machine of claim 2, further comprising a controller operatively coupled to the vacuum assembly and configured to switch the vacuum assembly on and off; and
   wherein, when switched on by the controller, the vacuum assembly provides suction to the hopper of the row unit and air flow through the row unit line toward the manifold assembly.

4. The agricultural machine of claim 3, wherein the controller is operatively coupled to the valve and configured to cause movement of the blocker between the first position and the second position.

5. The agricultural machine of claim 4, wherein the controller switches the vacuum assembly on simultaneously with movement of the blocker to the second position; and
   wherein the controller switches the vacuum assembly off simultaneously with movement of the blocker to the first position.

6. The agricultural machine of claim 2, further comprising a metering sensor configured to measure a characteristic associated with the commodity metered from the seed meter;
   wherein the metering sensor is operatively coupled to the controller and configured to send a signal to the controller indicative of the measured characteristic associated with the commodity metered from the seed meter; and
   wherein the controller is configured to switch on the vacuum assembly to provide suction to the hopper of the row unit and air flow through the row unit line in response to detecting an irregularity in the measured characteristic associated with the commodity metered from the seed meter.

7. The agricultural machine of claim 2, further comprising a metering sensor configured to measure the singulation rate of seed metered by the seed meter;
   wherein the metering sensor is operatively coupled to the controller and configured to send a signal to the controller indicative of the singulation rate of seed metered by the seed meter; and
   wherein the controller is configured to switch on the vacuum assembly to provide air flow through the row unit line in response to determining that a measured singulation rate is below a desired singulation rate.

8. The agricultural machine of claim 1, further comprising a reed valve formed in the hopper of the row unit;
    wherein the manifold assembly includes a valve having a blocker movable between a first position and second position;
    wherein when the blocker is in the first position, the reed valve is urged to an open position by the air flow from the blower to facilitate discharge of air flow from the hopper; and
    wherein when the blocker is in the second position, the reed valve is urged to a closed position by the air flow from the vacuum assembly to facilitate suction of commodity from the hopper.

9. The agricultural machine of claim 1, wherein the agricultural machine includes a plurality of row units and a plurality of row unit lines, wherein each row unit line is coupled between the manifold assembly and a hopper of a corresponding row unit;
    wherein the vacuum assembly includes a plurality of vacuum devices each configured to provide air flow through one row unit line and suction to a corresponding hopper; and
    wherein the agricultural machine further comprises a compressed air source configured to provide compressed air to each vacuum device.

10. The agricultural machine of claim 1, further comprising:
    a plurality of row units coupled to the frame, each comprising a hopper and a seed meter;
    a plurality of tank lines coupled between the tank and the manifold assembly;
    a plurality of row unit lines coupled between the manifold assembly and corresponding hoppers;
    wherein the manifold assembly includes a first manifold, a second manifold, and a valve positioned between and coupled to the first manifold and the second manifold;
    wherein the first manifold is coupled at a first end thereof to the plurality of tank lines and at a second end thereof to a first opening of the valve;
    wherein the second manifold is coupled at a first end thereof to the plurality of row unit lines and at a second end thereof to a second opening of the valve; and
    wherein the return line is couple to a third opening of the valve.

11. The agricultural machine of claim 1, wherein the manifold assembly is a first manifold assembly and the agricultural machine further comprises a second manifold assembly;
    wherein the agricultural machine further comprises:
        a first return line coupled between the first manifold assembly and the tank, and a second return line coupled between the second manifold assembly and the tank;
        a plurality of row units coupled to the frame, each comprising a hopper and a seed meter;
        a first plurality of tank lines coupled between the tank and the first manifold assembly, a second plurality of tank lines coupled between the tank and the second manifold assembly;
        a first plurality of row unit lines coupled between the manifold assembly and corresponding hoppers, and a second plurality of row unit lines coupled between the manifold assembly and corresponding hoppers;
    wherein the agricultural machine further comprises a compressed air source that provides air flow to the first manifold assembly and the second manifold assembly; and
    wherein the first manifold assembly and the second manifold assembly cannot receive airflow from the compressed air source simultaneously.

12. An agricultural machine for distributing commodity, comprising:
    a frame;
    a tank coupled to the frame and configured to store the commodity;
    a row unit coupled to the frame, the row unit comprising a hopper and a seed meter;
    a manifold assembly configured to direct commodity through the agricultural machine;
    a tank line coupled between the tank and a first opening of the manifold assembly;
    a row unit line coupled between a second opening of the manifold assembly and the hopper;
    a return line coupled to a third opening of the manifold assembly;
    a blower configured to provide an air flow through the tank line and the row unit line to transfer commodity from the tank, through the manifold assembly, and to the hopper of the row unit; and
    a vacuum assembly configured to provide an air flow through the row unit line and the return line to transfer commodity through the row unit line, through the manifold assembly, and through the return line;
    wherein the third opening is positioned between the first opening and the second opening.

13. The agricultural machine of claim 12, wherein the return line is coupled between the third opening of the manifold assembly and a seed bin that is separate from the tank; and
    wherein the vacuum assembly is configured to provide the air flow through the return line to transfer commodity through the return line to the seed bin.

14. The agricultural machine of claim 12, further comprising a controller operatively coupled to the vacuum assembly and configured to switch the vacuum assembly on and off; and
    wherein the vacuum assembly provides suction to the hopper of the row unit and air flow through the row unit line when switched on by the controller.

15. The agricultural machine of claim 12, wherein the manifold assembly includes a valve having a blocker movable between a first position and second position;
    wherein, when the blocker is in the first position, the commodity flows from the tank line, through the valve, to the row unit line; and
    wherein, when the blocker is in the second position, the commodity flows from the row unit line, through the valve, to the return line.

16. The agricultural machine of claim 15, further comprising a reed valve formed in the hopper of the row unit;
    wherein when the blocker is in the first position, the reed valve is in an open position facilitating discharge of air flow from the hopper; and
    wherein when the blocker is in the second position, the reed valve is in a closed position facilitating suction of commodity from the hopper.

17. The agricultural machine of claim 15, further comprising a user interface and a controller operatively coupled to the user interface and to the blocker;

wherein the controller is configured to move the blocker between the first position and the second position in response to input received from the user interface.

18. The agricultural machine of claim 17, further comprising a compressed air source that provides compressed air to the vacuum assembly when the blocker is in the second position.

19. A method of advancing commodity through an agricultural machine comprising:
advancing commodity from a tank, through a tank line, which is coupled between the tank and a manifold assembly;
subsequent to the prior advancing step, advancing the commodity through a first opening of a valve of the manifold assembly and subsequently through a second opening of the valve;
subsequent to the prior advancing step, advancing the commodity through a row unit line, away from the manifold assembly, wherein the row unit line is coupled between the manifold assembly and a hopper of a row unit;
subsequent to the prior advancing step, advancing the commodity from the hopper, through the row unit line toward the manifold;
subsequent to the prior advancing step, advancing the commodity through the second opening of the valve and subsequently through a third opening of the valve; and
subsequent to the prior advancing step, advancing the commodity through a return line away from the manifold assembly.

20. The method of claim 19, further comprising:
rearranging the valve from a first position, in which the third opening is blocked, to a second position, in which the first opening is blocked.

* * * * *